US012350811B2

(12) United States Patent
Hanlon

(10) Patent No.: US 12,350,811 B2
(45) Date of Patent: Jul. 8, 2025

(54) WORK SUPPORT

(71) Applicant: Perfect Site LLC, Las Vegas, NV (US)

(72) Inventor: Jared W. Hanlon, Las Vegas, NV (US)

(73) Assignee: Perfect Site LLC, Las Vegas, NV (US)

( * ) Notice: Subject to any disclaimer, the term of this patent is extended or adjusted under 35 U.S.C. 154(b) by 0 days.

(21) Appl. No.: 18/197,249

(22) Filed: May 15, 2023

(65) Prior Publication Data

US 2023/0278190 A1 Sep. 7, 2023

Related U.S. Application Data

(63) Continuation of application No. 17/068,753, filed on Oct. 12, 2020, now Pat. No. 11,648,659.

(60) Provisional application No. 62/913,709, filed on Oct. 10, 2019.

(51) Int. Cl.

*B25H 1/06* (2006.01)
*B25H 1/04* (2006.01)
*B25H 1/14* (2006.01)

(52) U.S. Cl.

CPC ................. *B25H 1/06* (2013.01); *B25H 1/14* (2013.01); *B25H 1/04* (2013.01)

(58) Field of Classification Search

CPC ............... B25H 1/06; B25H 1/14; B25H 1/04
See application file for complete search history.

(56) References Cited

U.S. PATENT DOCUMENTS 3,262,588 A * 7/1966 Davidson ............... B64D 9/003 414/536
4,974,651 A 12/1990 Carmon
5,547,242 A * 8/1996 Dukatz ............. B60N 2/01583 74/543
5,592,981 A 1/1997 Derecktor
6,173,660 B1 1/2001 Emmert
6,464,180 B2 * 10/2002 Workman ............... F16L 3/243 248/62
6,745,804 B2 6/2004 Welsh
7,185,738 B1 3/2007 Clepper
7,210,510 B2 5/2007 deTolly
7,418,907 B2 9/2008 Haimoff
7,448,608 B2 11/2008 Radermacher
8,191,486 B2 6/2012 Apps
8,684,052 B2 * 4/2014 Breitenbach ............. B25H 1/06 144/286.5
10,093,016 B2 10/2018 Ursell (Continued)

*Primary Examiner* — Eric J Rosen
*Assistant Examiner* — Christopher Soto
(74) *Attorney, Agent, or Firm* — Snell & Wilmer L.L.P.

(57) ABSTRACT

A work support has an extendable support beam for spanning between a pair of leg assemblies. The extendable support beam includes one or more elongated rails having a first end, a second end, an upper edge, a lower edge, a middle portion disposed between the upper edge and the lower edge, where the upper edge and the lower edge each extend away from the middle portion and form a channel having an interior surface and an exterior surface, and a t-track extending longitudinally along the interior surface. The work support includes the extendable support beams and a leg mount disposed between the pair of elongated rails, and a pair of legs pivotally coupled with the leg mount and moveable between a storage position where the pair of legs are secured within a cavity, and a working position.

13 Claims, 17 Drawing Sheets

(56) References Cited

U.S. PATENT DOCUMENTS

| | | | | |
|---|---|---|---|---|
| 10,093,017 | B2 | 10/2018 | Bimbaum | |
| D882,824 | S | 4/2020 | Hanlon | |
| 11,648,659 | B2 | 5/2023 | Hanlon | |
| 2004/0124036 | A1 * | 7/2004 | Ulshafter, Jr. | B25H 1/06 182/153 |
| 2006/0226311 | A1 | 10/2006 | Radermacher | |
| 2010/0107838 | A1 | 5/2010 | Berg | |
| 2010/0288585 | A1 | 11/2010 | Katz | |
| 2011/0198477 | A1 | 8/2011 | Bergmann | |
| 2014/0182443 | A1 | 7/2014 | Bokelaar | |

* cited by examiner

1500

WORK SUPPORT

RELATED APPLICATION DATA

This application is a continuation of U.S. application Ser. No. 17/068,753, filed Oct. 12, 2020, which claims priority to U.S. Provisional Application Ser. No. 62/913,709, filed Oct. 10, 2019. The present application claims priority to each of said applications and incorporates by reference each of said applications as if set forth fully herein.

FIELD OF THE INVENTION

The present invention relates to work stands, and more particularly relates to portable work stands that are adaptable for many uses.

BACKGROUND OF THE INVENTION

Work support stands are generally used for supporting, cutting, or shaping work pieces such as construction lumber, and other materials. Some work support stands are portable and configurable for supporting power tools, or functioning as a sawhorse. A support assembly includes supports for connecting the power tool to the work support stand. Miter saws are one such power tool that are often used with work support stands. The work support stand typically positions the miter saw at a height that matches the user's upper body so that the user does not have to kneel to use the miter saw. Many work support stands offer this functionality, but oftentimes the mechanisms to support the features of portability and securely mounting the miter saw result in a bulky work support stand that is difficult to ship, display, and store once purchased.

SUMMARY OF THE INVENTION

Disclosed is a work support having an extendable support beam for spanning between a pair of leg assemblies. The extendable support beam includes one or more elongated rails having a first end, a second end, an upper edge, a lower edge, a middle portion disposed between the upper edge and the lower edge, where the upper edge and the lower edge each extend away from the middle portion and form a channel having an interior surface and an exterior surface, and a t-track extending longitudinally along the interior surface.

In certain examples, the elongated rail comprises a first elongated rail and a second elongated rail. The second elongated rail may be identical to the first elongated rail. The extendable support beam also includes, in certain examples, a central member configured to slidingly engage the interior surface of each of the first elongated rail and the second elongated rail such that the first elongated rail and the second elongated rail are slidable along a longitudinal axis to one of extend or decrease an overall length of the extendable support beam.

In certain examples, the extendable support beam includes a biased detent positioned at an end of the central member, where the biased detent is configured to lock into an opening in the first elongated rail to prevent the central member from sliding past either the first end or the second end of the first elongated rail. The upper and/or lower edges may include an inwardly extending member configured to engage a mount.

The work support, in certain examples, includes the extendable support beams and a leg mount disposed between the pair of elongated rails, and a pair of legs pivotally coupled with the leg mount and moveable between a storage position where the pair of legs are secured within a cavity, and a working position.

Further objects, features, and advantages of the present invention over the prior art will become apparent from the detailed description of the drawings which follows, when considered with the attached figures.

DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Figure 1:
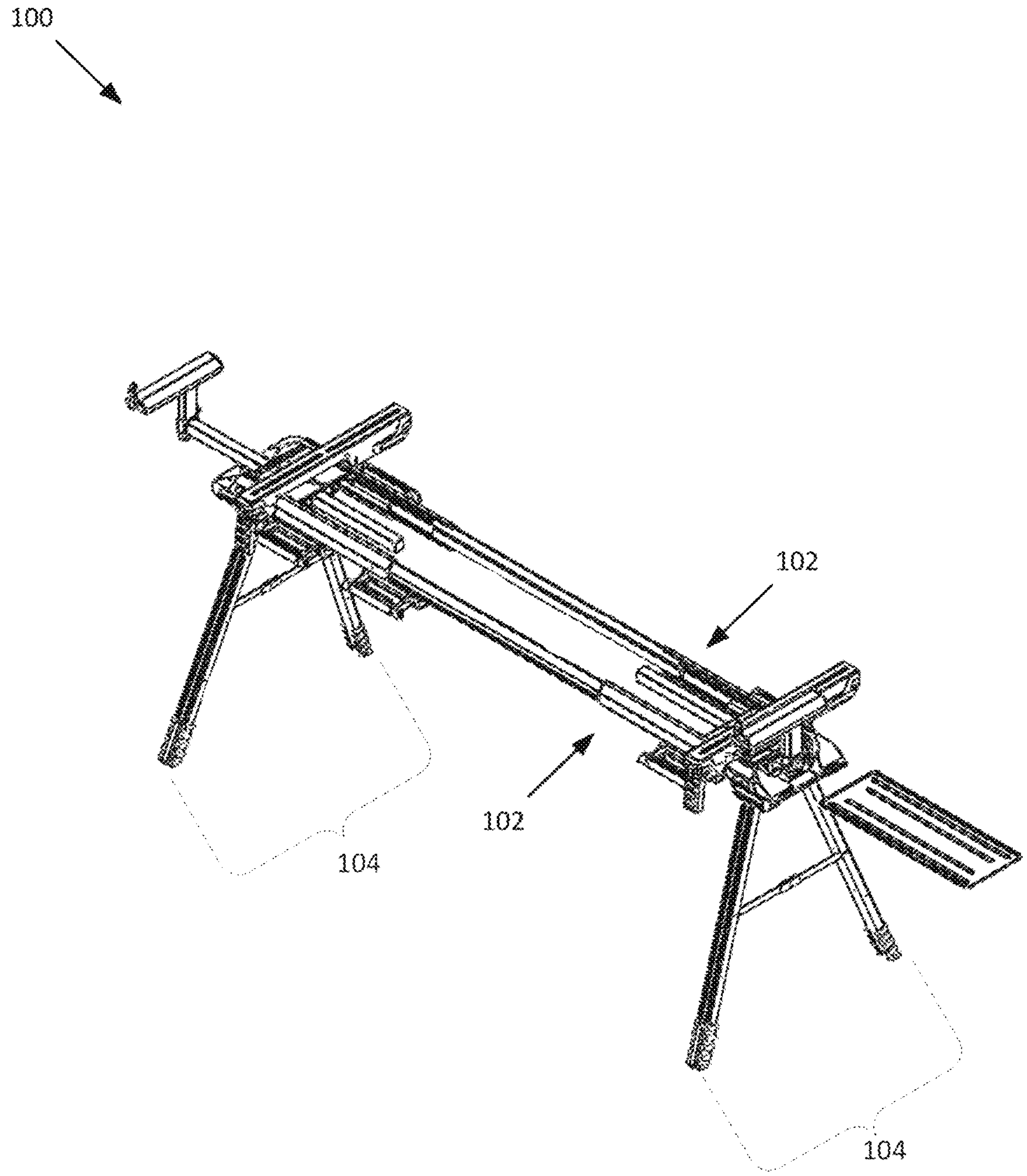
FIG. 1 is a perspective view diagram illustrating one embodiment of a work support in accordance with examples of the present disclosure.

FIG. 1 is a perspective view diagram illustrating one embodiment of a work support 100 in accordance with examples of the present disclosure. The work support 100, as will be discussed in greater detail below, is configurable for many uses, including but not limited to, a miter saw stand, a low-profile miter saw stand, a sawhorse, and a clamping table. The work support 100, in certain embodiments, is manufactured of a combination of metal and/or plastic components. In particular, the support beams (formed of one or more rails 102) that extend between the pairs of legs 104, may be aluminum (or an alloy thereof) and extruded. The rails 102 are spaced apart a distance that allows for the legs 104 to collapse and fold in between the rails 102. This beneficially allows for the entire work support 100 to be packaged efficiently, and displayed neatly on a store's shelves.

Figure 2:
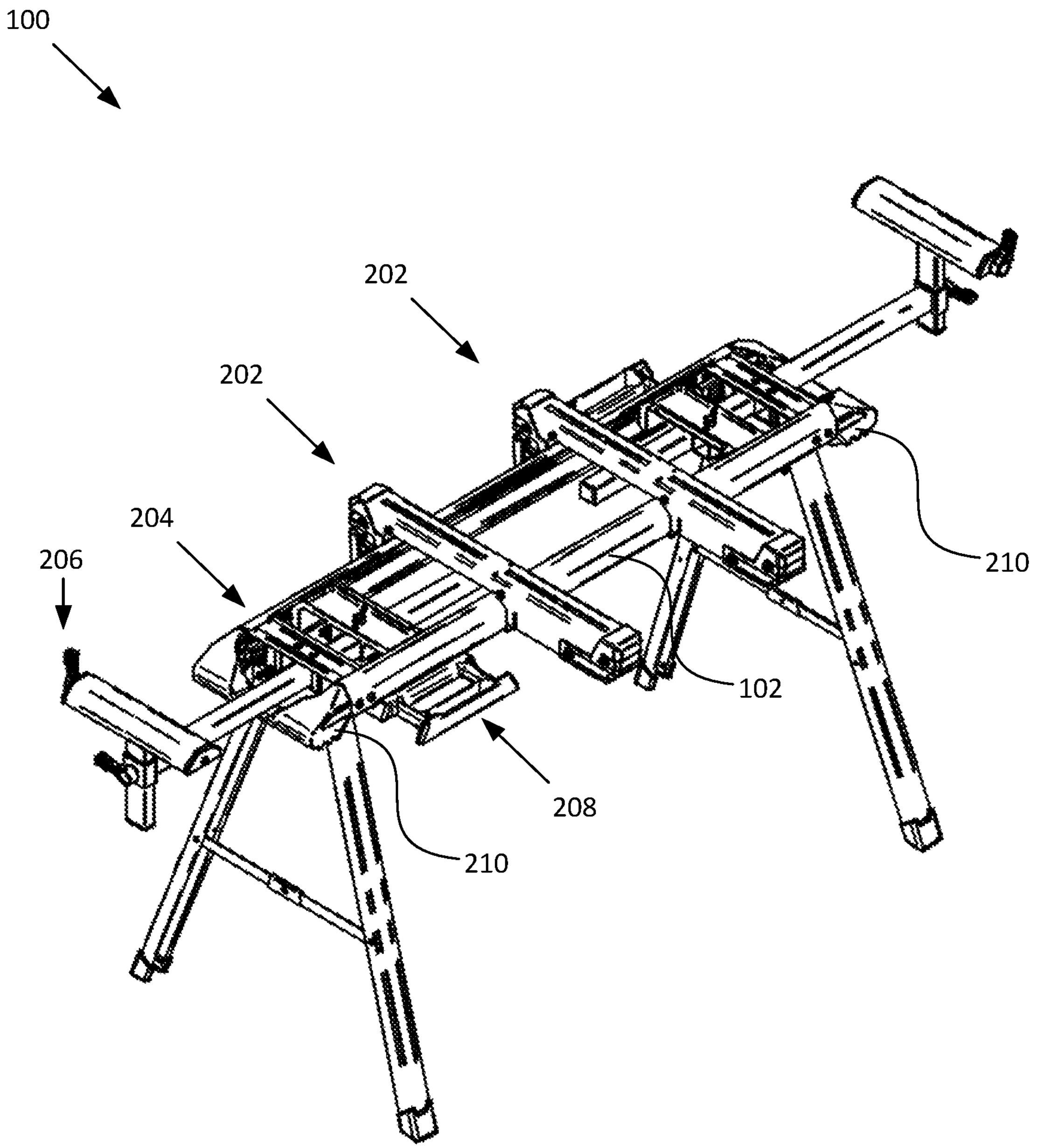
FIG. 2 is another perspective view diagram illustrating one embodiment of the work support in accordance with examples of the present disclosure.

FIG. 2 is another perspective view diagram illustrating one embodiment of the work support 100 in accordance with examples of the present disclosure. In certain embodiments, the rails 102 are configured to receive removable saw mounts 202. In other embodiments, the saw mounts 202 are configured to couple with other tools including, but not limited to, grinders, sanders, portable table saws, planers, etc. The saw mounts 202 are configured with an inner jaw that mates to an exterior surface of a rail (see FIG. 9, see also 102 of FIG. 1). A lever of the saw mount 202 engages the inner jaw and causes the inner jaw to clamp onto the rails 102.

Also depicted in FIG. 2, is a leg mount 204. In certain embodiments, the leg mount 204 (see also FIG. 14) couples to interior surfaces of the rails 102 and rotatably couples the legs 104 to the leg mount 204. The leg mount 204, as will be described below in greater detail with reference to FIG. 3, includes openings for receiving a slidable board support 206. The leg mount 204 couples to the rails 102 and torsionally stiffens the work support 100.

The work support 100, in certain embodiments, includes side handles 208 and end handles 210. The side handles 208 extend outward laterally from one of the rails 102 and may be coupled to a bottom surface of the rail 102 with fasteners (not shown). The end handles 210 engage both of the rails 102 and, in certain embodiments, insert into a channel formed by the rails 102. Fasteners may secure each end handle 210 to the rails 102.

Figure 3:
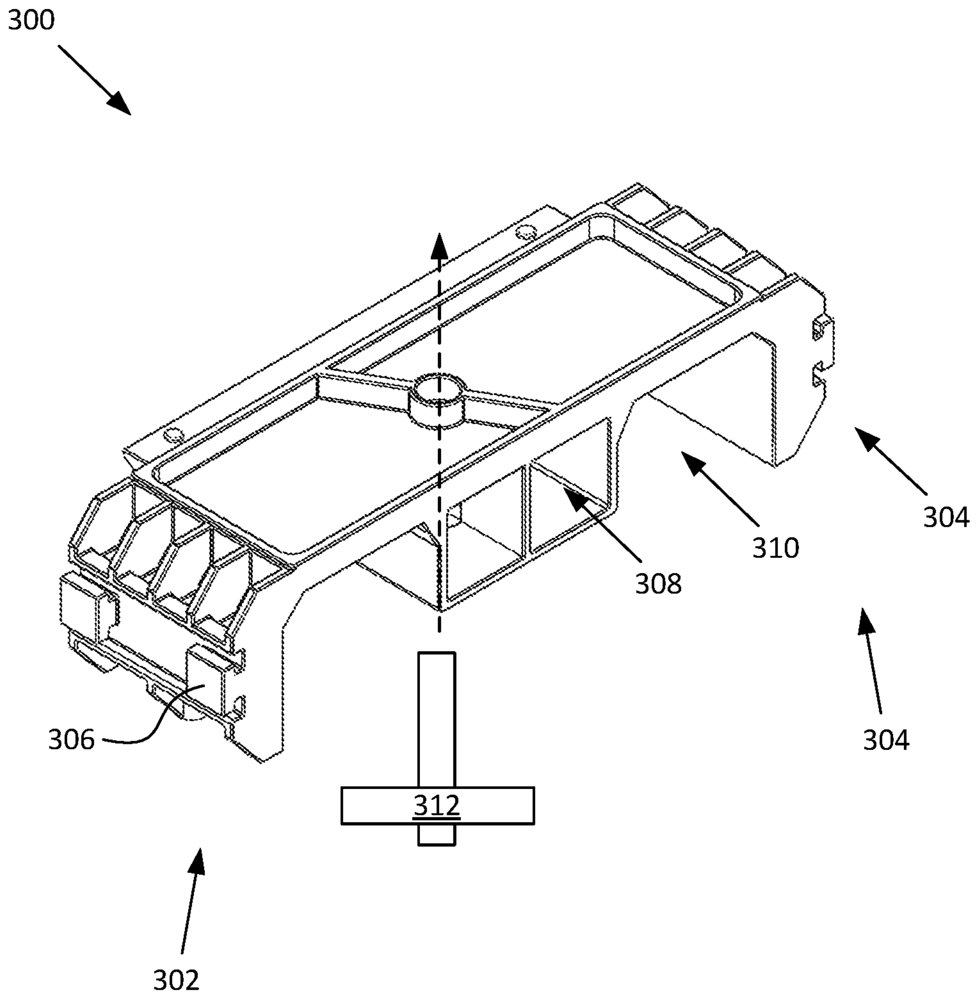
FIG. 3 is a perspective view diagram illustrating one embodiment of a leg bracket in accordance with embodiments of the present disclosure.

FIG. 3 is a perspective view diagram illustrating one embodiment of a leg bracket 300 in accordance with embodiments of the present disclosure. The leg bracket 300, in certain embodiments, may be formed of a durable polymer material, or alternatively, a metal alloy. The leg bracket 300 extends transversely between the rails 102 from a first end 302 to a second end 304. Each end 302, 304 of the leg bracket 300 is formed to mate with the interior surface of the rail 102. In the depicted embodiment, this shape is generally a C-shape and includes a T-member or protrusion 306 that mates with a T-shaped channel in the rail. It is contemplated that other shapes may be implemented that slidingly lock one end of the leg bracket 300 to one of the rails 102.

In certain embodiments, the leg bracket 300 includes openings 308 for the board support 206 (e.g., an extendable board support) to pass through the leg bracket. Additionally, the leg bracket 300 includes leg channels 310 for receiving and securing the legs 104 when the legs are in a collapsed, storage position. A rotatable butterfly handle 312 with a twist-lock mechanism secures the legs 104 in the storage position. The rotatable butterfly handle 312 is also configured to lock the slidable board support 206 in any position between a fully extended position and a fully retracted position. This may be accomplished with an off-set cam inside the butterfly handle 312 that engages the board support 206 and prevents movement.

Figure 4:
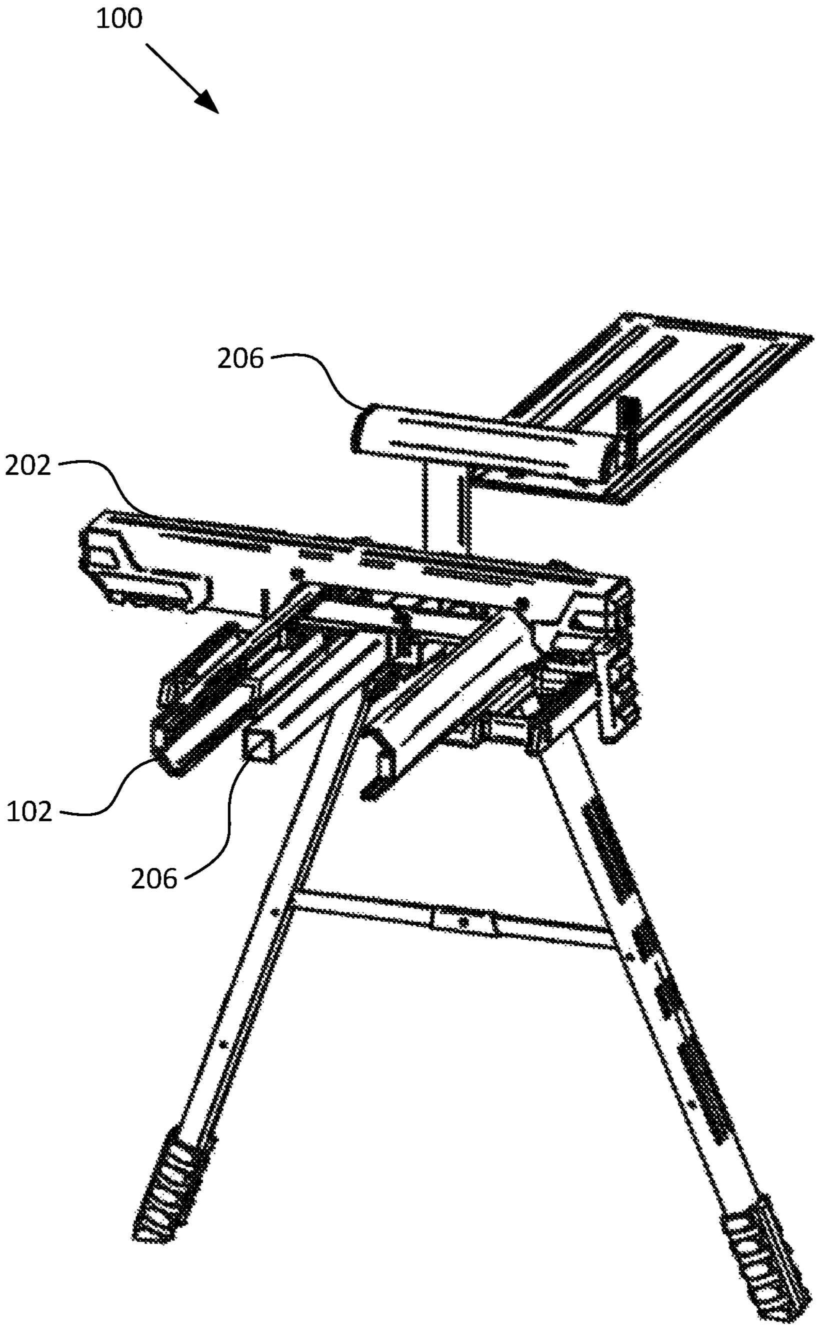
FIG. 4 is a cross-sectional perspective view diagram illustrating one embodiment of the work support in accordance with embodiments of the present disclosure.

FIG. 4 is a cross-sectional perspective view diagram illustrating one embodiment of the work support 100 in accordance with embodiments of the present disclosure. As depicted, the rails 102 have a C-shaped cross-sectional profile that may be formed of extruded aluminum. The board support 206 is configured to slide into and out of the work support 100 to accommodate different length boards. In certain embodiments, the rails are extendable. In alternative embodiments, the rails are of fixed length.

Figure 5:
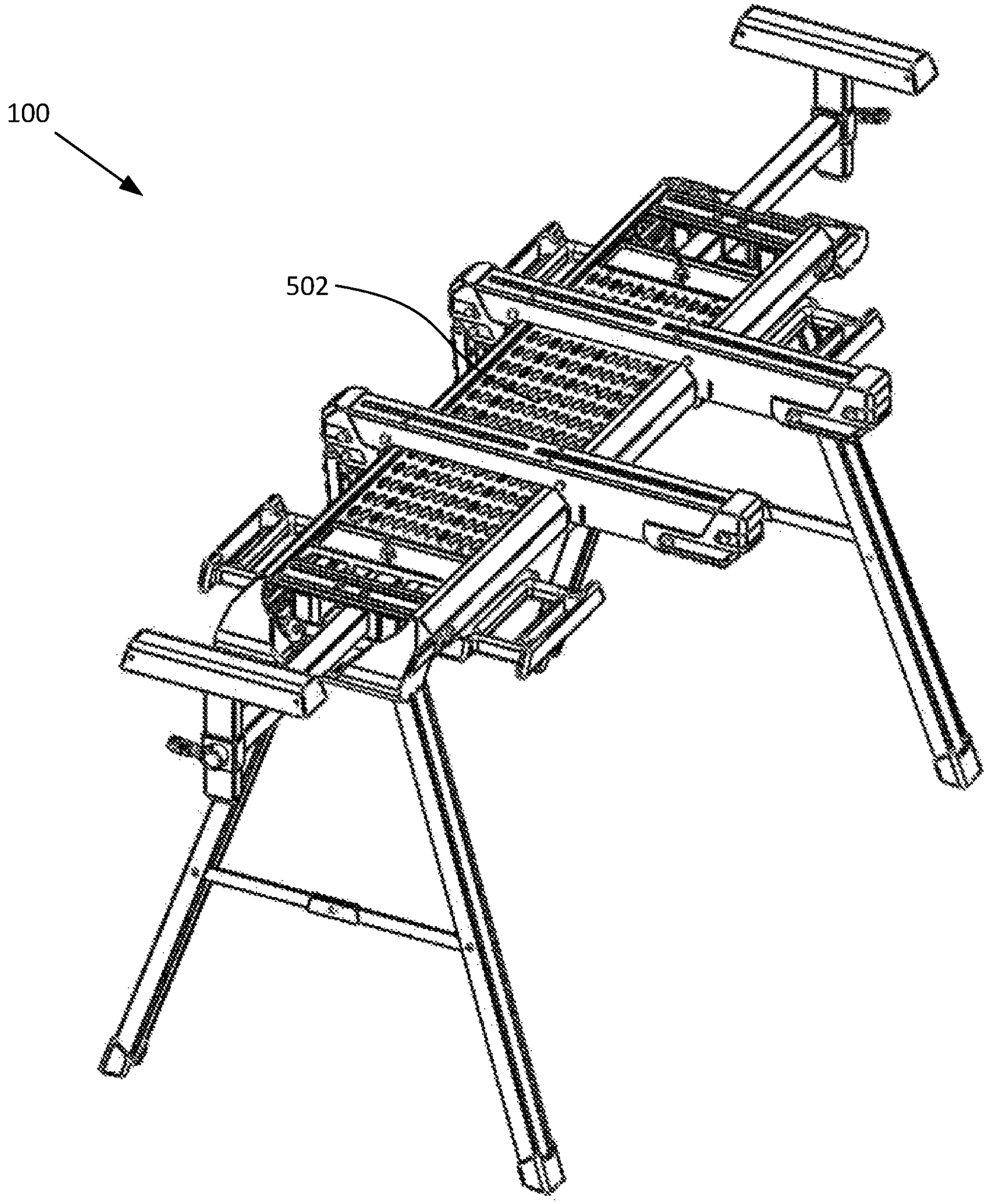
FIG. 5 is a perspective view diagram illustrating another embodiment of the work support in accordance with embodiments of the present disclosure.

FIG. 5 is a perspective view diagram illustrating another embodiment of the work support 100 in accordance with embodiments of the present disclosure. The work support 100, in the depicted embodiment, may include a removable work surface 502. The work surface 502, in certain embodiments, is formed of sheet metal and includes an array of openings. The openings are useful for many operations, including attachment of clamping devices, etc. The work surface 502 may also be utilized as a welding table. Beneficially, the rails 102 are spaced apart a distance selected to accommodate multiples of pieces of lumber, for example, two 2×4 pieces, as will be described in greater detail below.

Figure 6A:
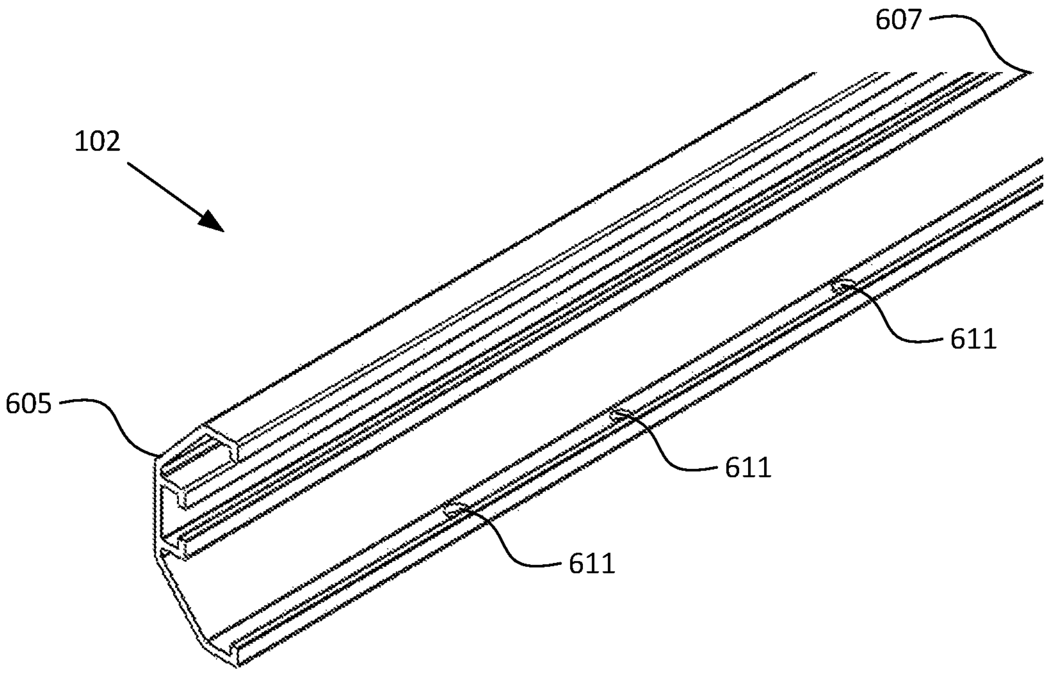
FIGS. 6*a* and 6*b* depict the cross-sectional profile of the rails, in accordance with embodiments of the present disclosure.
Figure 6B:
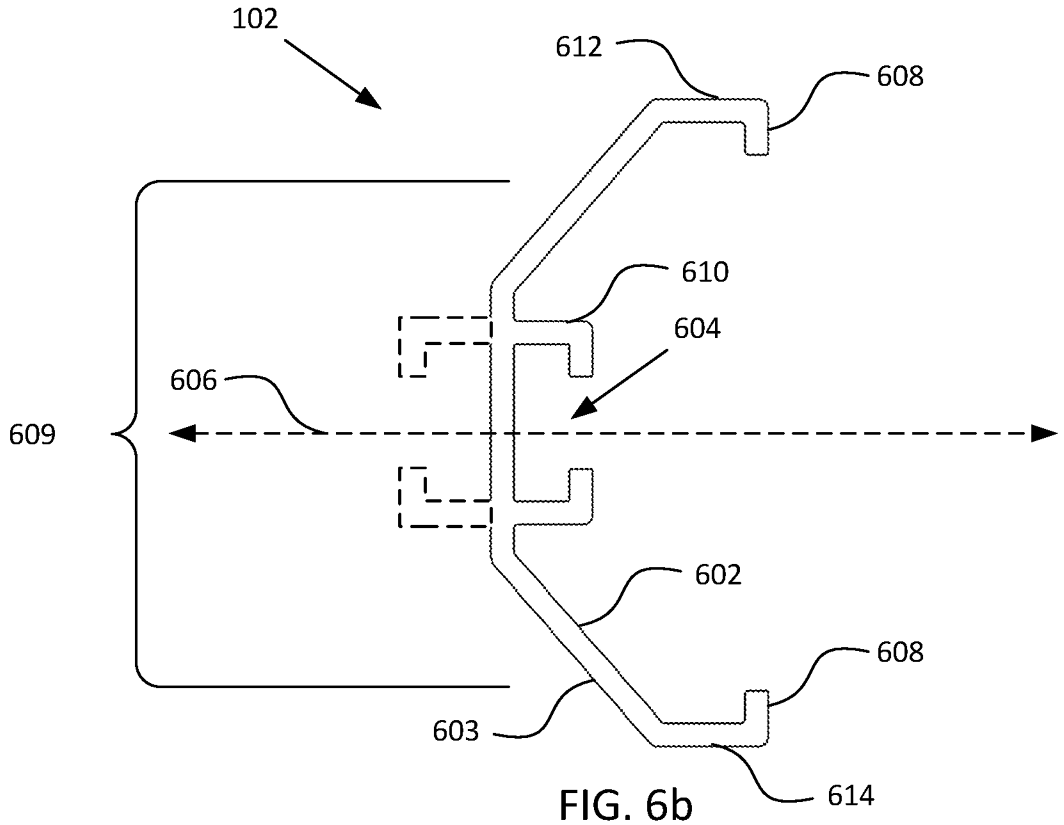

FIGS. 6*a* and 6*b* depict the cross-sectional profile of the rails 102, in accordance with embodiments of the present disclosure. In certain embodiments, the cross-sectional profile of each rail 102 is generally C-shaped. However, other cross-sectional profiles are contemplated (see FIG. 17). An interior surface 602 of the rail 102, in certain examples, includes a T-channel or track 604. The T-track 604 is useful for laterally securing brackets, members, etc., to the rail 102. As used herein, a longitudinal axis refers to an axis that extends from one end of the rail to the opposing end of the rail, and a lateral axis 606 extends outward laterally in a direction generally perpendicular to the longitudinal axis. As such, extending laterally from the rail 102 refers to extending in a direction along the lateral axis 606.

The t-track 604 is formed of members 610 that extend laterally from the interior surface 602 of the rail 102. In other examples, the thickness of the rail 102 is increased and the t-track 604 is formed within that thickness. Other geometric shapes are contemplated that allow for the movement of a component longitudinally along the rail, but that prevent lateral movement. An upper edge 612 and a lower edge 614 of the rail 102, in certain embodiments, include an inwardly extending member 608. Stated differently, each edge of the C-shape cross-sectional profile has a serif-like projection that extends toward the extending member 608 of the opposing edge. These inwardly extending members 608 are useful for locking components, such as a low-profile tool mount, as will be described below in greater detail (see FIG. 9). Alternatively, the C-shaped profile terminates at each edge 612, 614 with members that extend substantially coaxially.

Disposed between the upper edge 612 and the lower edge 614 is a middle portion 609. The middle portion 609 extends between the upper edge 612 and the lower edge 614, and forms the interior surface 602 and the exterior surface 603. The t-track 604 may be formed on one or more of the interior surface 602 or the exterior surface. The rail 102, in certain examples, has a first end 605 and a second end 607. The t-track 604 may extend from the first end 605 to the second end 607. In other examples, the t-track 604 extends from an area near the first end 605 to an area near the second end 607.

In a further embodiment, openings 611 are formed in the surface of the rail 102 for mounting components, such as the side handles 208 and end handles 210. The openings 611, in certain examples, receive fasteners, or alternatively, protrusions from the component that mate to the rail 102.

In certain examples, the t-track 604 may be formed on the exterior surface of the rail 102, as depicted by the dotted lines. This, beneficially, allows for the attachment of various accessories, including, but not limited to, moveable/slidable handles, flip-up top, clamping bench, etc.

Figure 7:
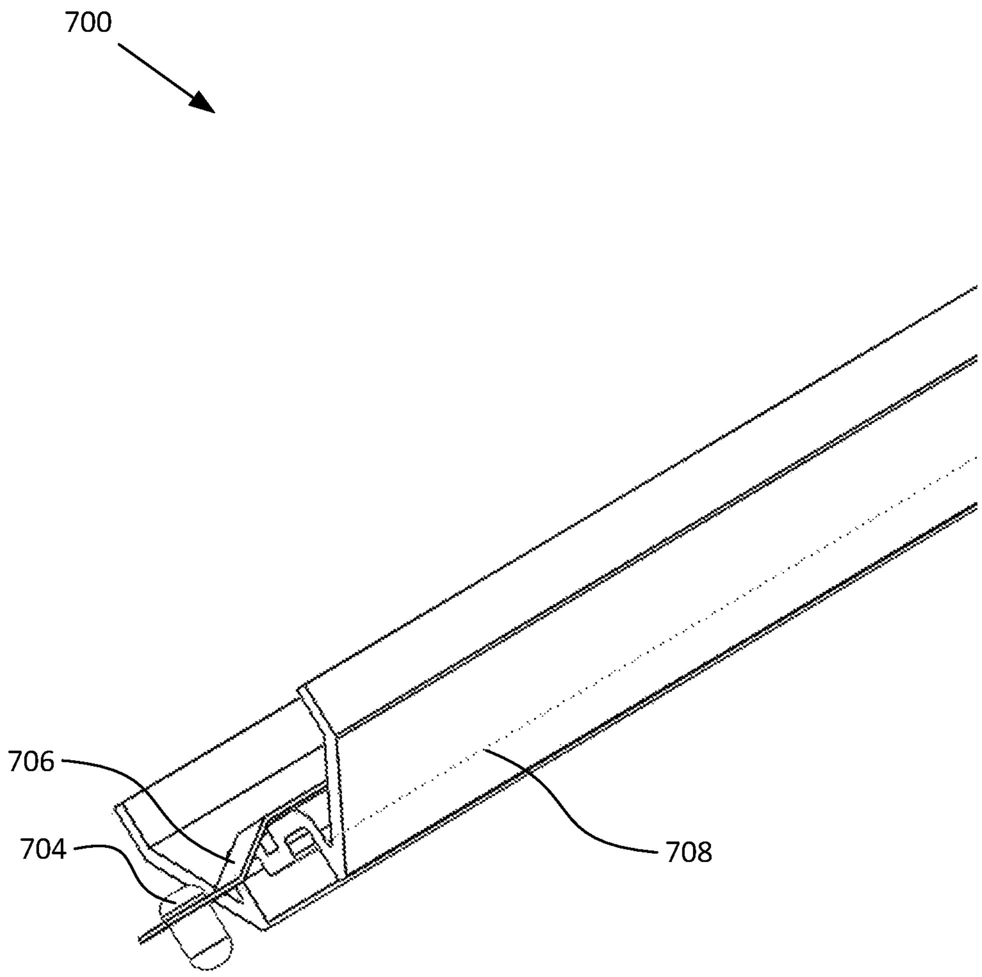
FIG. 7 is a perspective view diagram illustrating one embodiment of a central member of an extendable rail system in accordance with embodiments of the present disclosure.

FIG. 7 is a perspective view diagram illustrating one embodiment of a central member 700 of an extendable rail system in accordance with embodiments of the present disclosure. The extendable central member 700, in certain examples, is formed with a generally C-shaped cross-sectional profile configured to engage an interior surface of the rail 102. The central member 700, in certain examples, includes a fastener for securing the central member 700 to one of the rails 102. In certain examples, the fastener is a screw, or alternatively a depressible detent 704 that is biased by a mounting member 706. The detent 704 is configured to pop into an opening in the rail and prevent the rail 102 from sliding past the end of the central member 700.

The central member 700 engages the interior surface of an extendable rail 102 and also an adjacent extendable rail 102. As such, the central member 700 slidingly engages a pair of rails 102 to coaxially align the rails 102. 708 depicts the longitudinal axis.

Figure 8:
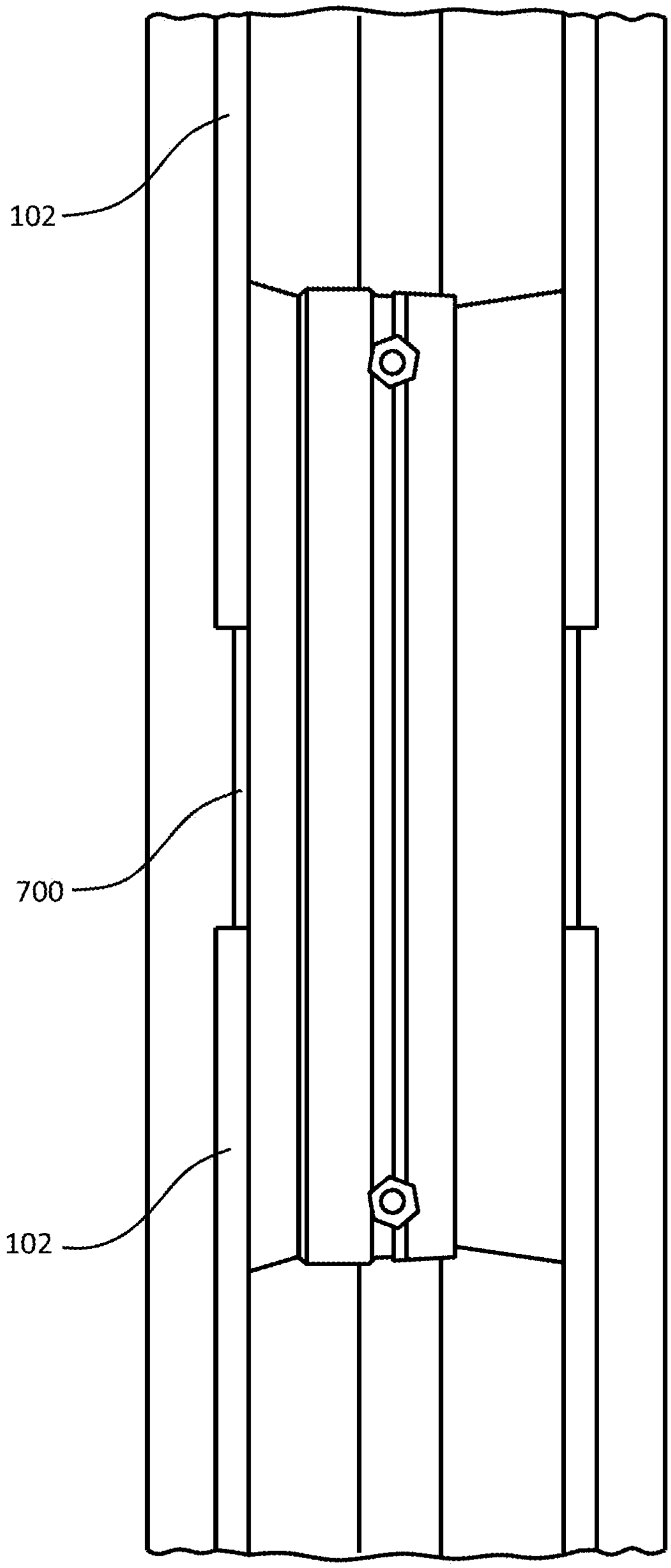
FIG. 8 is a side view diagram illustrating one example of slidable rails in accordance with examples of the present disclosure.

FIG. 8 is a side view diagram illustrating one example of slidable rails 102 in accordance with examples of the present disclosure. The central member 700 engages and coaxially aligns a pair of adjacent rails 102. The central member 700, in certain examples, includes fasteners that engage the T-track 604 of the rails. As depicted, the central member 700 is formed of a resilient polymer material, such as ABS, while the rails 102 are formed of an extruded aluminum allow. In other examples, the central rail 700 is formed of the same material as the rails 102.

Figure 9A:
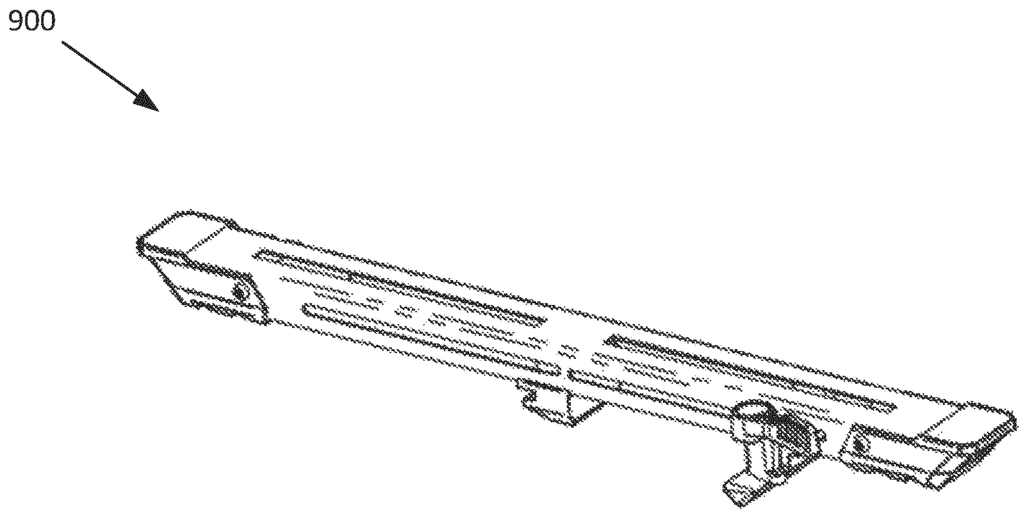
FIGS. 9*a* and 9*b* depict embodiments of a low-profile tool mount in accordance with examples of the present disclosure.
Figure 9B:
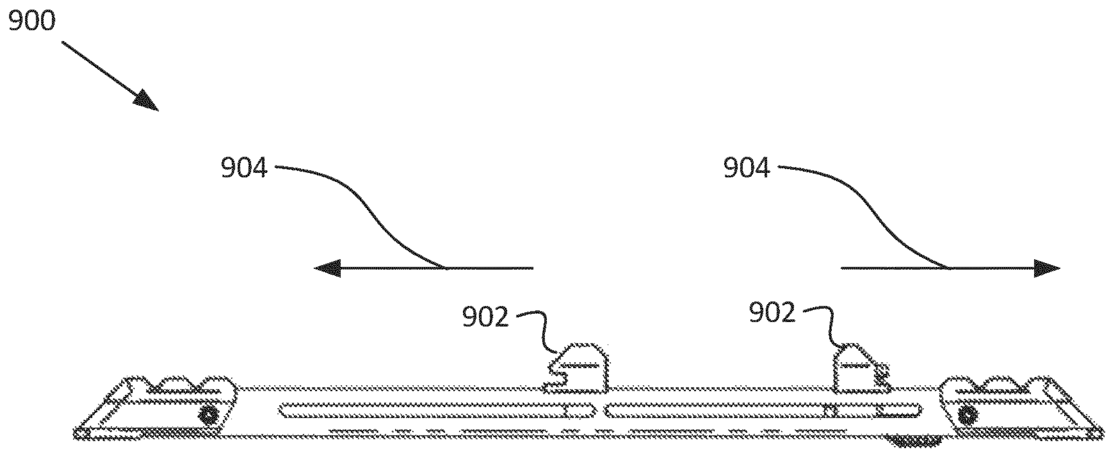

FIGS. 9*a* and 9*b* depict embodiments of a low-profile tool mount 900 in accordance with examples of the present disclosure. The low-profile tool mount 900 is configured to couple to the interior surface of the rails 102. In contrast with common tool-mount systems for work supports that mount to the exterior surface of a rail, the low-profile tool mount 900 includes engaging members 902 that provide a clamping force in a direction towards the edges of the tool mount 900, as depicted by arrows 904. Conversely, common tool mounts provide a clamping force directed inwards that clamps on exterior surfaces of the rails. The engagement members 902 are configured to mate with a portion of the interior surface of the rails 102. Furthermore, it will also be appreciated that the first and second engagement members 902 are configured to slide along an axis 912.

Figure 10:
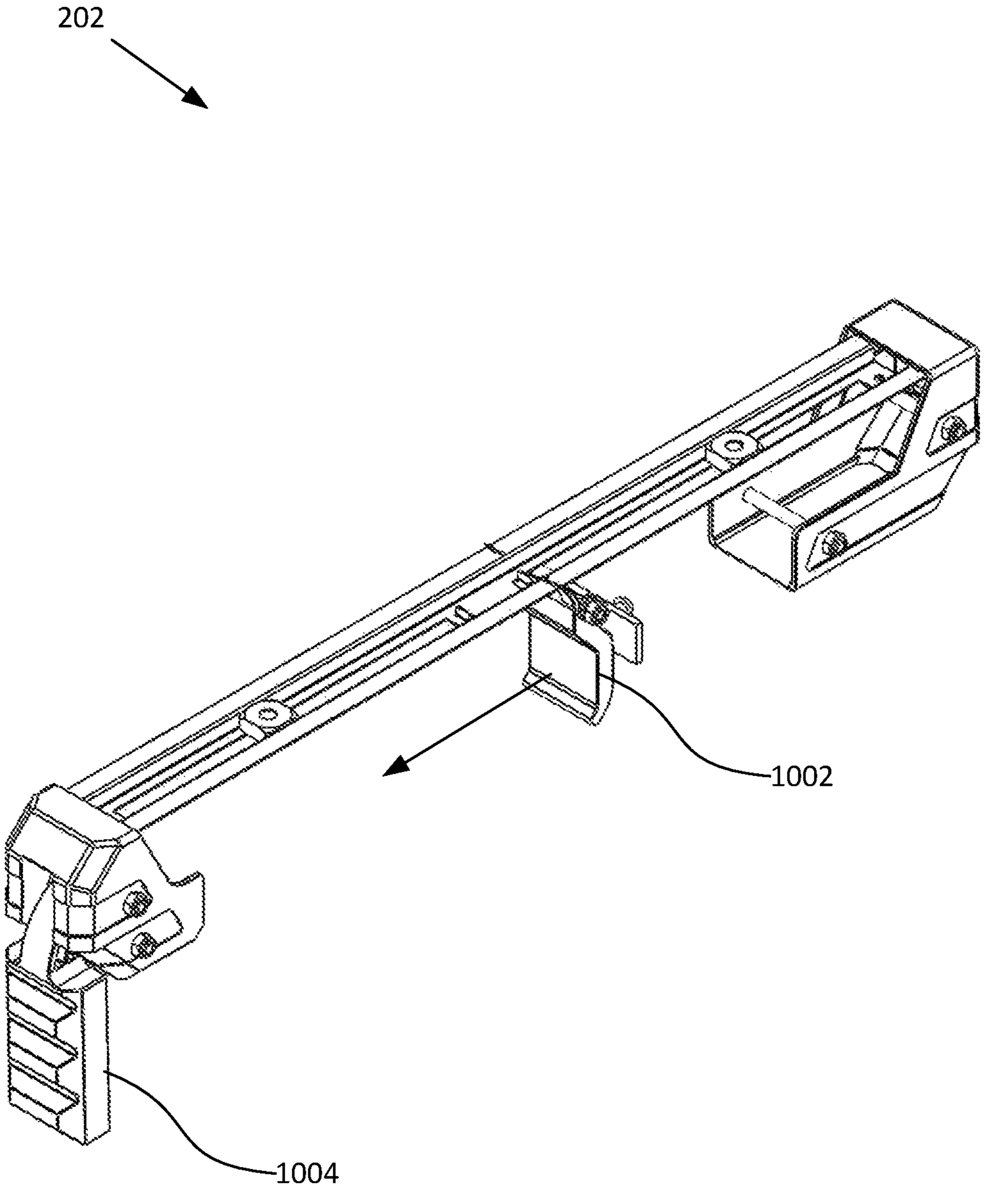
FIG. 10 is a perspective view diagram of a portion of the tool mount in accordance with embodiments of the present disclosure.

FIG. 10 is a perspective view diagram of a portion of the tool mount 202 in accordance with embodiments of the present disclosure. As described above with reference to FIG. 2, the tool mount 202, in certain examples, includes engagement members that mate with exterior surfaces of the rails 102. These engagement members 1002 provide a clamping force that is directed inward, or towards the opposing engagement member (not shown). The engagement members 1002 of the tool mount 202 may include surfaces configured to engage with the exterior surfaces of the rail 102. In the depicted example, the engagement members 1002 include a general C-shape for mating with the exterior surfaces of the rail 102. At least one of the engagement members 1002 is positionable, and lockable in a predetermined location. A lever 1004 may include a cam-type mechanism that creates a clamping force on the rails 102.

Figure 11:
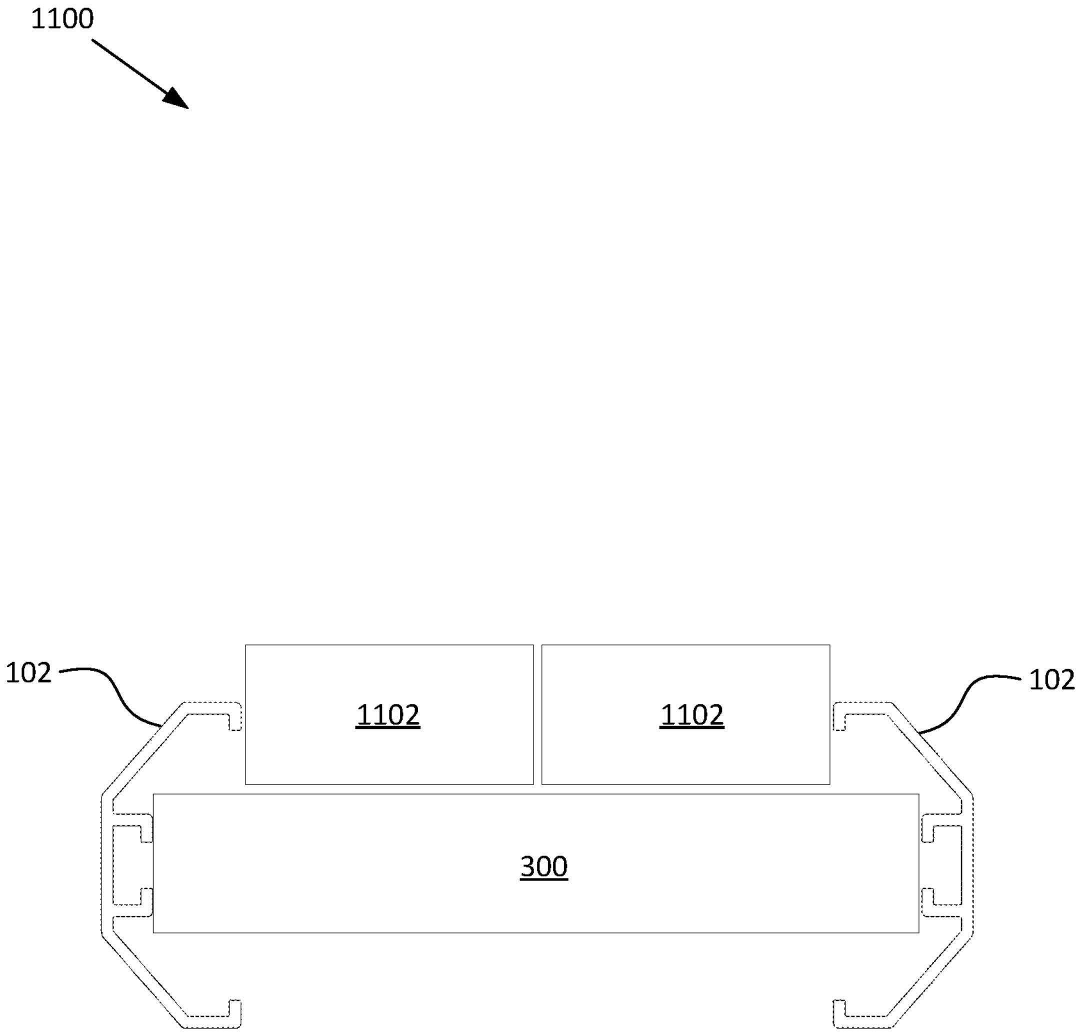
FIG. 11 is a diagram illustrating one embodiment of a work support in accordance with embodiments of the present disclosure.

FIG. 11 is a diagram illustrating one embodiment of a work support 1100 in accordance with embodiments of the present disclosure. In certain embodiments, the work support 1100 is configured to receive board members to form a disposable work surface. Often times it is necessary to cut a board on a work support, however, the act of cutting the board destroys the work surface because a cutting blade must extend entirely through the board to complete the cut. The cutting blade then also extends slightly into a work surface of a sawhorse, which damages the sawhorse. Beneficially, the work support 1100 is configured to receive a board member 1102 between the rails 102. The board member 1102 is supported by, in certain examples, the leg mount 204 or leg bracket 300.

The leg mount 204 and the leg bracket 300 cause the board member 1102 to extend upward above a top surface of the rails 102. Accordingly, a worker may then cut another piece of board on top of the board member 1102 without damaging the rails 102. The board member 1102 serves as a sacrificial work surface. In certain embodiments, the rails 102 are spaced apart a distance selected to receive a common 2×8 board member, or a pair of 2×4 board members. The board member 1102, in certain examples, is fastenable to either of the leg mount 204 or the leg bracket 300. In other examples, an end bracket engages the end of the board member 1102. In certain examples, the board members 1102 are held in place by a slight friction fit with the rails 102.

Figure 12A:
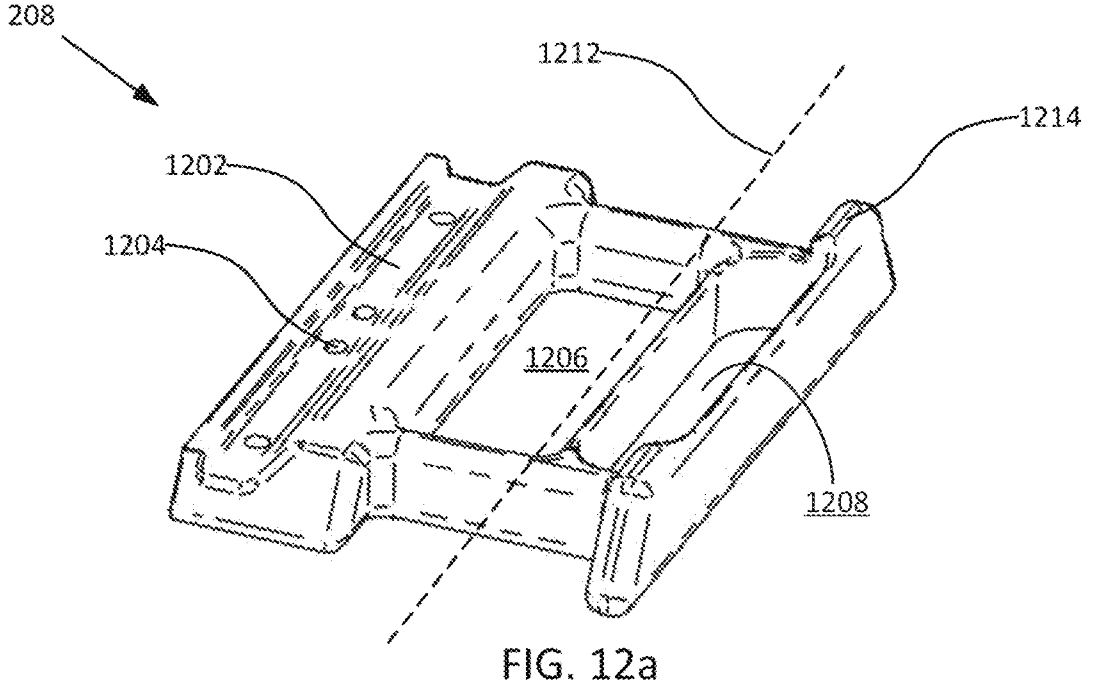
FIG. 12*a* is a perspective view diagram illustrating one embodiment of a side handle in accordance with examples of the present disclosure.

FIG. 12*a* is a perspective view diagram illustrating one embodiment of a side handle 208 in accordance with examples of the present disclosure. The side handle 208, in certain examples, is configured to fasten to a side of a rail 102. The side handle 208 includes a mounting surface 1202 having a shape to mate with the exterior bottom surface of the rail 102. Openings 1204 in the side handle 208 are configured to receive a fastener that couples the side handle 208 to the rail 102.

In certain examples, the side handle 208 is formed with openings 1206 and 1208. Opening 1206 is configured to receive a user's hand. Opening 1208 is configured to receive a tool. For example, a clip of a tape measure may be inserted into opening 1208. Additionally, the top surface of the side handle 208 may have a raised portion 1210 that is sized and configured to receive a board member. A board member may be placed horizontally across two side handles 208 in a manner similar to line 1212. Raised portion 1214 maintains the position of the board member on the side handle 208. This is useful for storing scrap pieces of wood. In certain examples, the opening 1206 is sized to receive a board member and hold the board member in a substantially vertical position, as opposed to the previously described horizontal position.

Figure 12B:
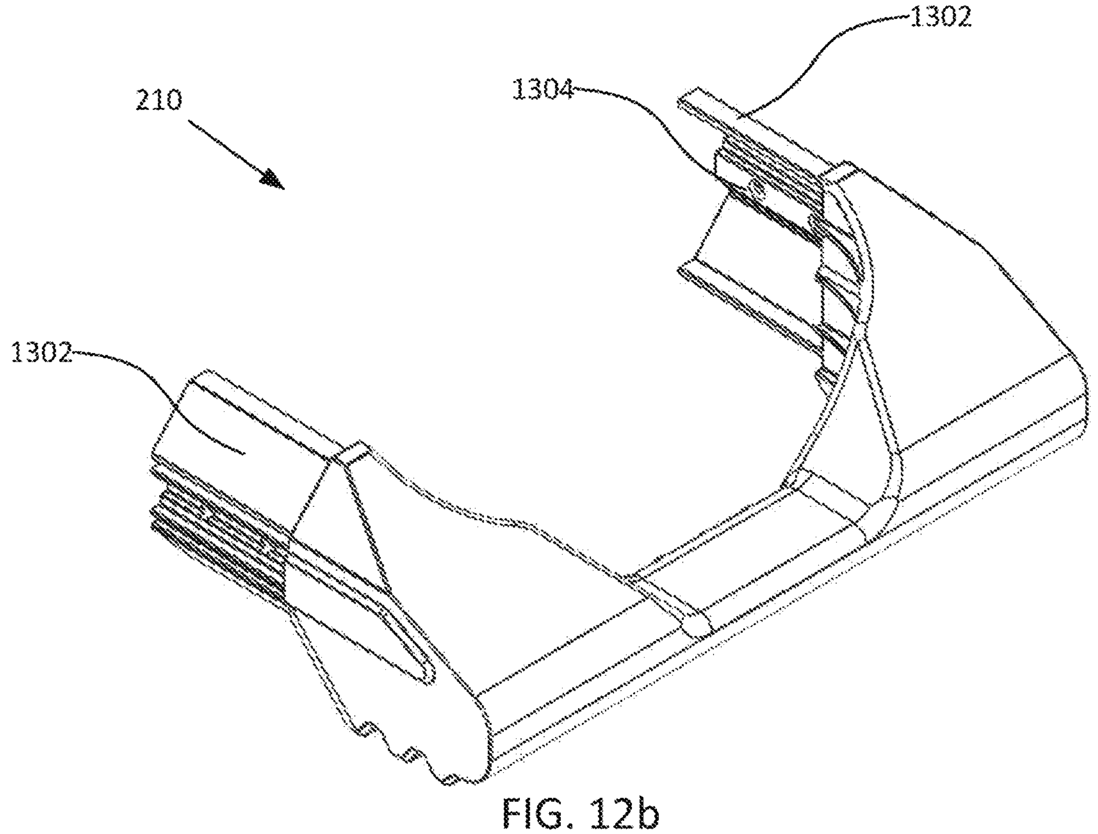
FIGS. 12*b* and 13 are perspective view diagrams illustrating one embodiment of the end handle in accordance with examples of the present disclosure.
Figure 13:
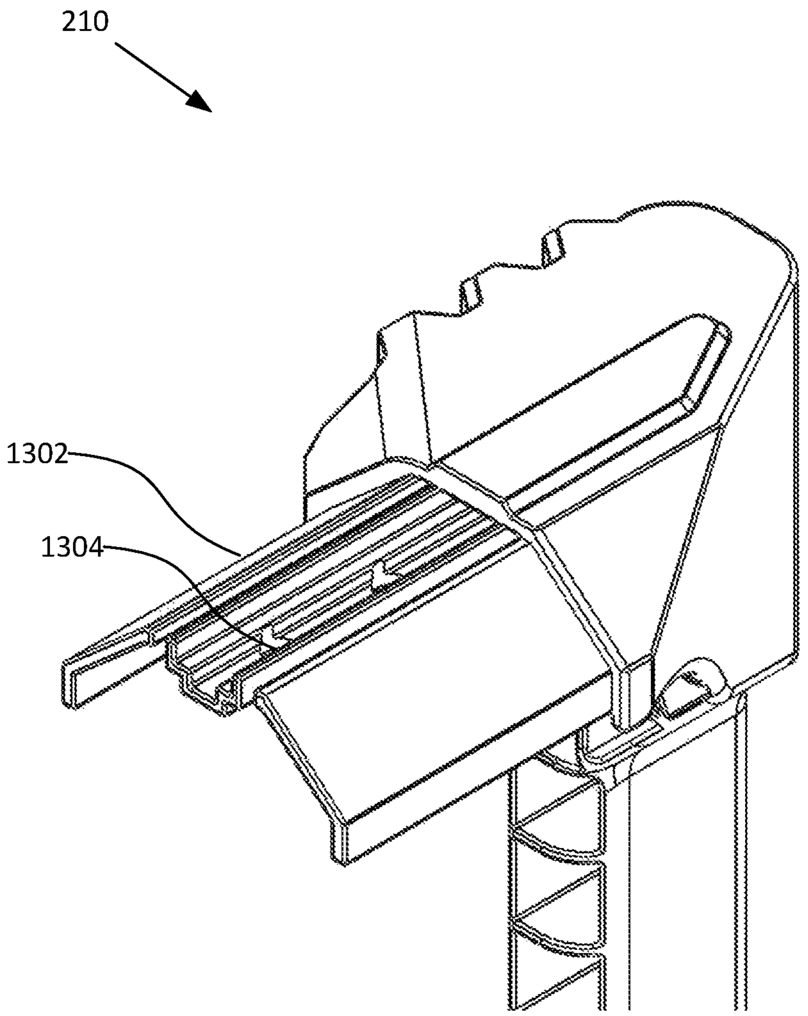

FIGS. 12*b* and 13 are perspective view diagrams illustrating one embodiment of the end handle 210 in accordance with examples of the present disclosure. The end handle 210 is configured to insert into ends of the rails 102 and space apart the rails 102 a predetermined distance. The distance, as described above, is selected to accommodate a board member or multiples of board members. In other words, the predetermined distance is a multiple of 3.5 inches (the actual width of a 2×4). In certain examples, the board member is a standard 2×8 piece of lumber. The ends 1302 of the side handle 210 are configured with a C-shaped cross-sectional profile configured to slidingly engage the interior surface of the rails 102. Each side handle 210 includes a pair of ends 1302 for engaging a pair of rails 102. Openings 1304 in the ends 1302 of the rails are configured to align with openings in the rails 102, through which fasteners may pass and secure the end handles 210 to the rails. Each work support 100, in certain examples, includes a pair of end handles 210 at opposing ends of a pair of rails 102. The end handle 210 may be provided with any configuration of ends 1302 to match any cross-sectional profile of rail 102. In additional examples, the ends 1302 of the end handle 210 may be configured with a T-shape insert for mating with the T-track of the rails 102.

Figure 14:
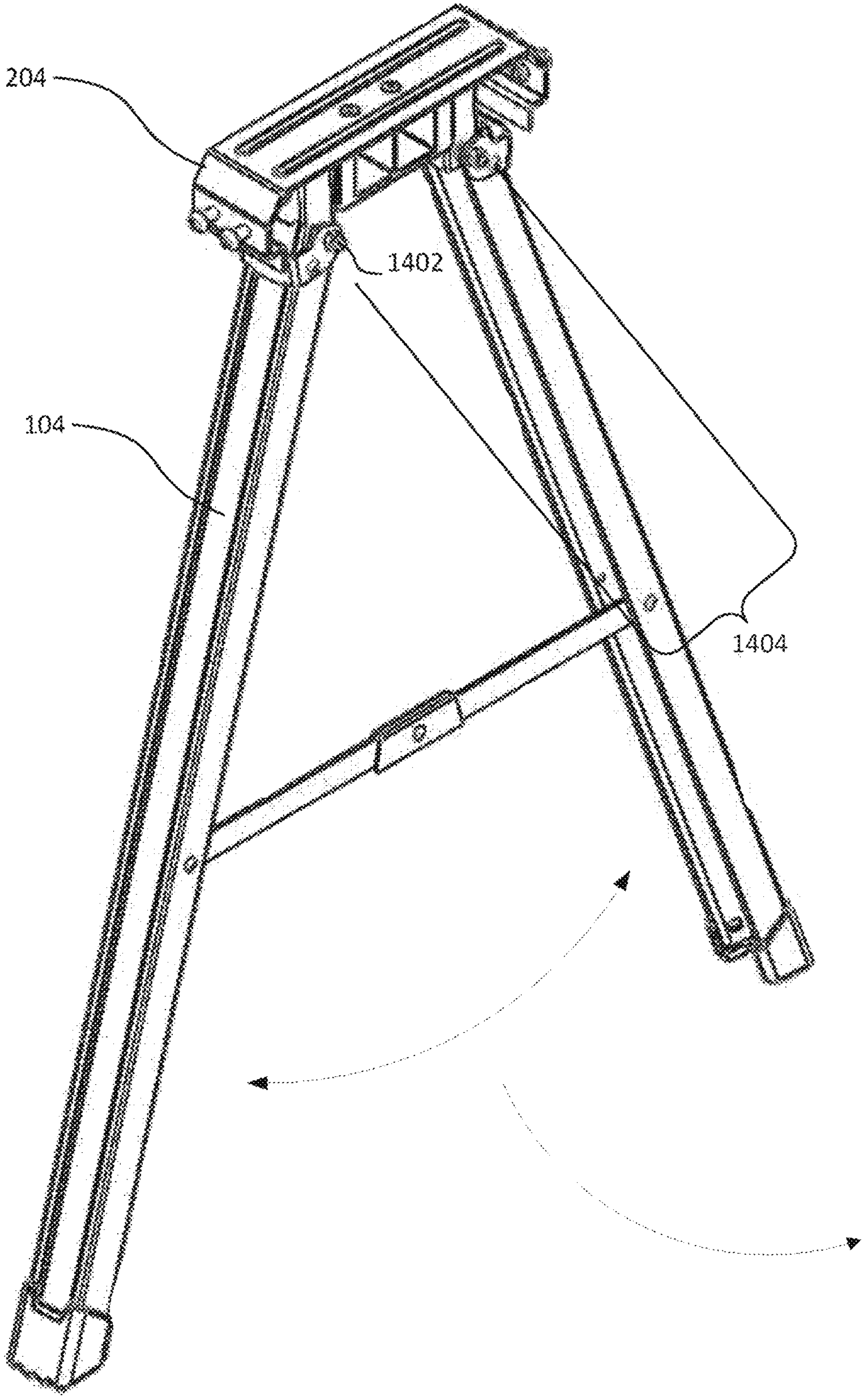
FIG. 14 is a perspective view diagram illustrating one example of a leg assembly (leg mount and legs), in accordance with examples of the present disclosure.

FIG. 14 is a perspective view diagram illustrating one example of a leg assembly (leg mount 204 and legs 104), in accordance with examples of the present disclosure. The leg mount 204, as described above, is shaped with ends configured to mate to the interior surfaces of the rails 102. Fasteners may extend through the rails 102 into the ends of the leg mount to secure the leg mount 204 to the rails. The width of the leg mount 204 is selected to accommodate, in certain examples, the width of a board member. The leg mount 204 is provided with a pivot mount for allowing the legs 104 to pivot in a longitudinal direction. In other words, the legs 104 are configured to collapse towards each other, and then pivot into a cavity formed by the rails 102.

In certain embodiments, the pivoting mount points 1402 of the legs on the leg mount 204 are spaced apart a distance 1404 of between about 2 and 10 inches. This beneficially provides stability to the work support 100. Conversely, many common work supports have legs that are attached to the same pivot point which is less stable.

Figure 15:
FIG. 15 is a perspective view diagram illustrating one example of a sawhorse configuration of the work support in accordance with examples of the present disclosure.

FIG. 15 is a perspective view diagram illustrating one example of a sawhorse configuration of the work support 1500 in accordance with examples of the present disclosure. As discussed above, the work support may be configured as a sawhorse with a work surface. The work surface, in certain examples, is a sacrificial board member such as a 2×8. In other examples, the work surface is coupled to the work support 1500.

Figure 16:
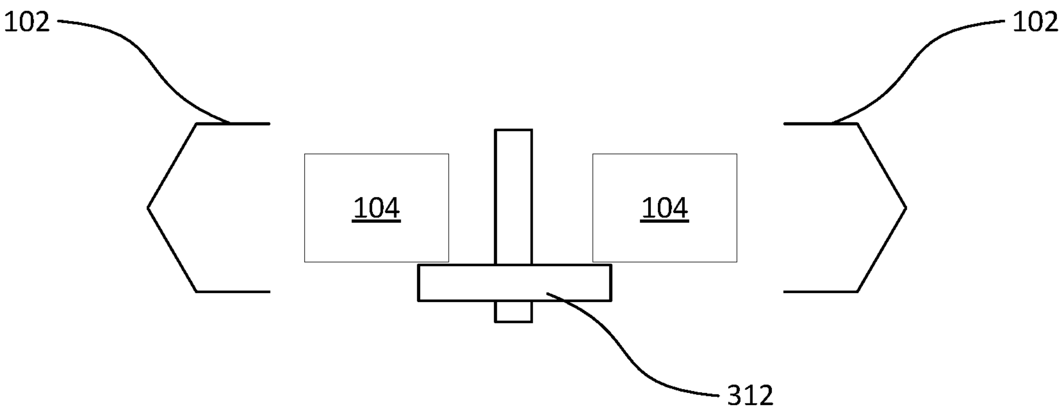
FIG. 16 is a schematic block diagram illustrating one embodiment of the work support in accordance with examples of the present disclosure.
Figure 17A:
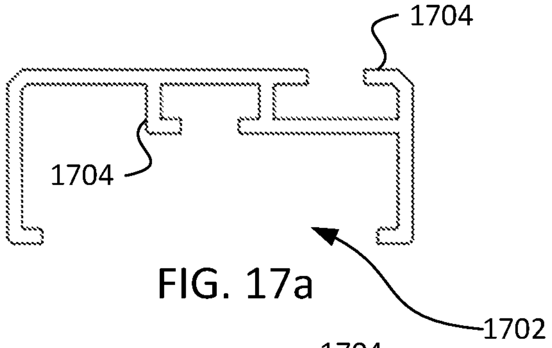
FIGS. 17*a*-17*e* are cross-sectional diagrams illustrating rails, according to examples of the subject disclosure.
Figure 17B:
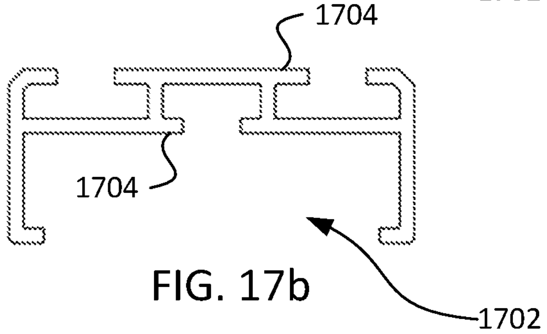
Figure 17C:
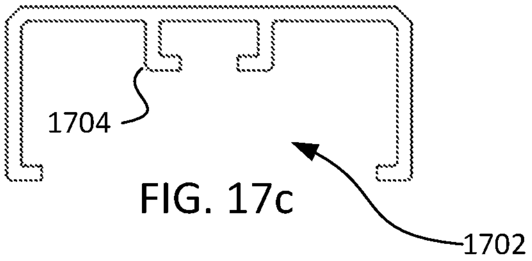
Figure 17D:
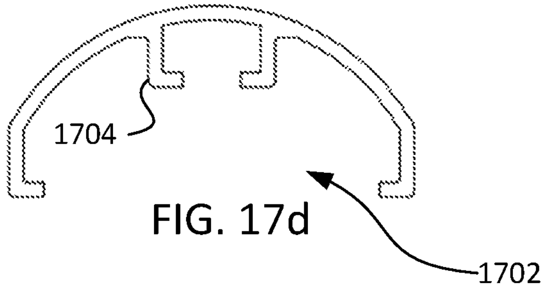
Figure 17E:
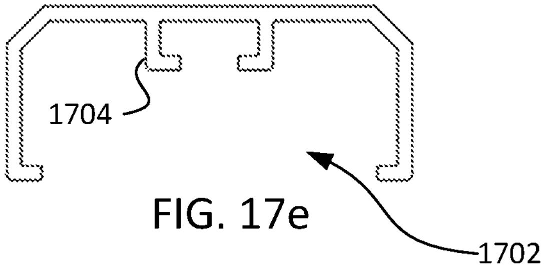

FIG. 16 is a schematic block diagram illustrating one embodiment of the work support 100 in accordance with examples of the present disclosure. The depicted embodiment illustrates the legs 104 in the folded or storage position, as opposed to the extended or working position described above (see also FIG. 1). The legs 104 pivot into a cavity formed by the rails 102. The legs 104 may be secured in place by the butterfly handle 312.

FIGS. 17*a*-17*e* are cross-sectional diagrams illustrating rails, according to examples of the subject disclosure. In the depicted examples, the rail 102 described above with reference to FIGS. 1-16 may be replaced with many variations of cross-sectional profiles. In each example, however, the interior side 1702 of each rail includes a t-track 1704. Exterior surfaces may be planar, or substantially planar (e.g., FIGS. 17*a*, 17*b*, 17*c*, and 17*e*) or curvilinear (e.g., FIG. 17*d*). The exterior surfaces may include one or more t-tracks 1704 which are useful for attaching accessories, as described above.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent to another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A work support comprising:

a support comprising:

a first elongated rail and a second elongated rail disposed parallel to the first elongated rail, each of the first and second elongated rails having an interior surface, the interior surfaces facing each other and defining a cavity therebetween, and each of the first and second elongated rails having an opposing exterior surface, and at least one tool mount comprising:

a first engagement member, a second engagement member, wherein said first and second engagement members are configured to slide along an axis, and an elongated component configured to be located at a top of each of the first and second elongated rails without extending through the first and second elongated rails, wherein each of the first and second engagement members are slidably coupled to the elongated component for location within the cavity between the rails and engagement with the interior surfaces of the first and second elongated rails to connect the elongated component thereto, wherein the elongated component spans across each of the first and second elongated rails;

a leg mount disposed between the first and second elongated rails, the leg mount having a first end configured to engage with the interior surface of the first rail and a second end configured to engage with the interior surface of the second rail; and a pair of legs pivotally coupled with the leg mount.

2. The work support of claim 1, wherein said elongated component has a longitudinal axis, and wherein the axis on which said first and second engagement members are configured to slide is disposed parallel to the longitudinal axis.

3. The work support of claim 2, wherein said at least one tool mount comprises a first tool mount and a second tool mount spaced from said first tool mount.

4. The work support of claim 1, wherein each of said first and second engagement members has a clamping face, and wherein the clamping faces of said first and second engagement members face in corresponding opposing directions along the axis toward the corresponding interior surfaces of the first and second elongated rails.

5. The work support of claim 4, wherein the clamping faces each provide a clamping force by engaging one of the interior surfaces, each clamping force being in a direction outward from the other engagement member and away from the other interior surface.

6. The work support of claim 1, wherein the pair of legs is moveable between a storage position where the pair of legs is secured within the cavity formed by the interior surfaces of the first rail and the second rail, and a working position.

7. The work support of claim 1, wherein each interior surface has a t-track extending longitudinally.

8. The work support of claim 7, wherein each interior surface further has an upper edge, a lower edge, and each of the upward edges and the lower edges comprise an inwardly extending member configured to engage the tool mount, where the inwardly extending member of the upper edge extends toward the inwardly extending member of the lower edge, where each t-track comprises a par of inwardly extending members each configured to extend toward one another, and where the inwardly extending members of the upper edges and the lower edges are separate from the pair of inwardly extending members of the t-track.

9. A work support comprising:

a main support comprising:

a first elongated rail and a second elongated rail disposed parallel to the first elongated rail and spaced therefrom, each of the first and second elongated rails having an interior surface, the interior surfaces facing each other and defining a cavity therebetween, and each of the first and second elongated rails having an opposing exterior surface, a leg mount disposed between the first and second elongated rails, the leg mount having a first end configured to engage with the interior surface of the first elongated rail and a second end configured to engage with the interior surface of the second elongated rail, and a pair of legs pivotally coupled with the leg mount; and at least one tool mount comprising:

an elongated tool mount configured to be transversely mounted across a top of both the first and second elongated rails to be supported thereby, said elongated tool mount having a first end and a second end and an axis extending therethrough, said elongated tool mount further comprising a first engagement member and a second engagement member, said first and second engagement members extending downwardly from said elongated tool mount for location in said cavity between said first and second elongated rails when said elongated tool mount is located on said first and second elongated rails, and said first and second engagement members slidably coupled to the elongated tool mount along the axis, whereby said first engagement member is slidable towards and away from the first elongated rail and said second engagement member is slidable towards and away from the second elongated rail for selectively engaging the interior surfaces of the first and second engagement members with said first and second elongated rails to connect said elongated tool mount thereto.

10. The work support of claim 9, wherein the pair of legs is moveable between a storage position where the pair of legs is secured within the cavity formed by the interior surfaces of the first rail and the second rail, and a working position.

11. The work support of claim 9, wherein each interior surface has a t-track extending longitudinally.

12. The work support of claim 11, wherein each interior surface further has an upper edge, a lower edge, and each of the upward edges and the lower edges comprise an inwardly extending member configured to engage the tool mount, where the inwardly extending member of the upper edge extends toward the inwardly extending member of the lower edge, where each t-track comprises a par of inwardly extending members each configured to extend toward one another, and where the inwardly extending members of the upper edges and the lower edges are separate from the pair of inwardly extending members of the t-track.

13. The work support of claim 9, wherein each of said first and second engagement members has a clamping face, wherein the clamping faces of said first and second engagement members face in corresponding opposing directions along the axis toward the corresponding interior surfaces of the first and second elongated rails, and wherein the clamping faces each provide a clamping force by engaging one of the interior surfaces, each clamping force being in a direction outward from the other engagement member and away from the other interior surface.

* * * * *